April 3, 1951     A. W. BRAITHWAITE     2,547,254
VALVE
Filed July 5, 1944                                         3 Sheets-Sheet 1
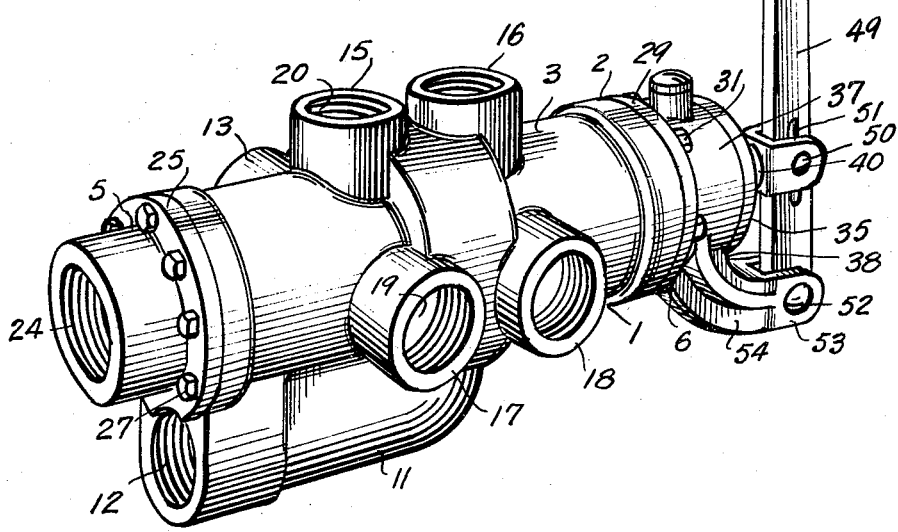
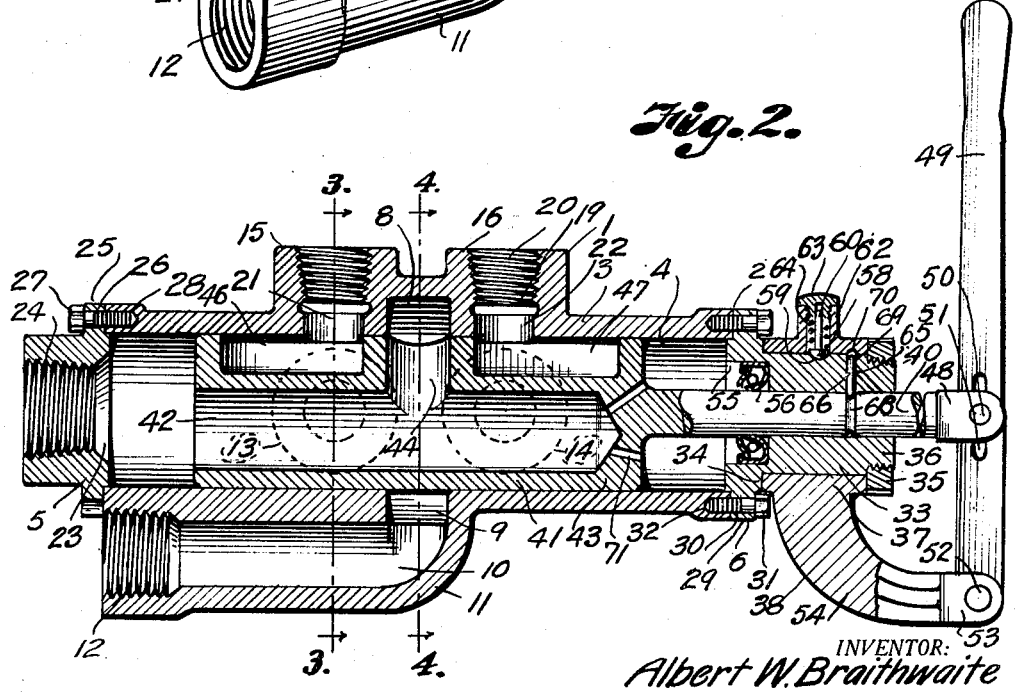
INVENTOR:
Albert W. Braithwaite
BY
Fishburn & Mullendore
ATTORNEYS.

April 3, 1951 A. W. BRAITHWAITE 2,547,254
VALVE
Filed July 5, 1944 3 Sheets-Sheet 2

INVENTOR:
Albert W. Braithwaite.
BY
Fishburn & Mullendore
ATTORNEYS.

April 3, 1951    A. W. BRAITHWAITE    2,547,254
VALVE
Filed July 5, 1944    3 Sheets—Sheet 3

INVENTOR:
Albert W. Braithwaite
BY Fishburn & Mullendore
ATTORNEYS.

Patented Apr. 3, 1951

2,547,254

UNITED STATES PATENT OFFICE 2,547,254

VALVE

Albert W. Braithwaite, Enid, Okla., assignor to The George E. Failing Supply Company, Enid, Okla., a corporation of Oklahoma Application July 5, 1944, Serial No. 543,539

14 Claims. (Cl. 251—76)

This invention relates to control valves for directing flow of fluid medium to and from a plurality of devices to be actuated selectively or in selective directions; for example, rotary drilling rigs employ a number of hydraulically-actuated mechanisms, for example, the mechanisms for raising and lowering the mast or derrick, for shifting the rotary mechanism into and out of drilling position, and for feeding the drill pipe.

In order to avoid a multiplicity of controls for the various mechanisms and complicated piping systems, it is desirable to operate such devices with a single control selectively in either of their directions of movement, but such controls constructed before the present invention have not been entirely satisfactory because of the possibility that the operator might inadvertently shift the control lever to operate another mechanism before a moving mechanism has come to rest, or to operate a mechanism which is not in condition to be operated at the time.

It is, therefore, the principal object of the present invention to provide a safe control mechanism adapted for controlling flow to and from a plurality of fluid actuated mechanisms and which involves a neutral position where the fluid may be kept in circulation through the control mechanism while maintaining positive closure of flow passageways leading to and from the mechanisms adapted to be operated.

It is also a prime object of the present invention to provide a control mechanism wherein the control element is shiftable through the neutral position before flow of fluid can be established to and from another of the mechanisms after fluid has just been cut off to one of the mechanisms.

Other objects of the invention are to provide an interlock mechanism between valving positions to prevent shifting of the control element without first shifting through neutral position; to provide a control mechanism that is easily operated; and to provide a control mechanism wherein the different positions of the control element are readily noted by the operator through position of the operating lever.

In accomplishing these and other objects of the invention hereinafter pointed out, I have provided improved structure, the preferred form of which is illustrated in the accompanying drawings wherein:

Fig. 1 is a perspective view of a control mechanism embodying the features of the present invention.

Fig. 2 is a longitudinal sectional view through the control mechanism illustrating the control element in neutral position and flow of actuating fluid blocked to and from ports adapted to be connected with a mechanism to be actuated.

Figure 3:
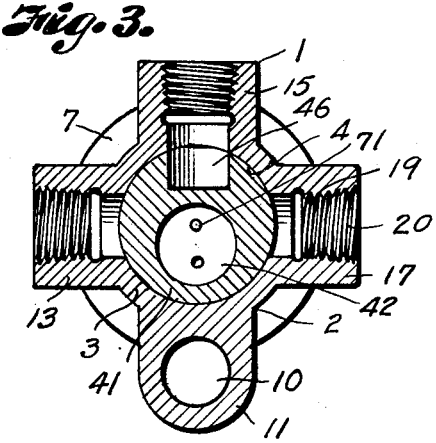
Fig. 3 is a cross section on the line 3—3 of Fig. 2.
Figure 4:
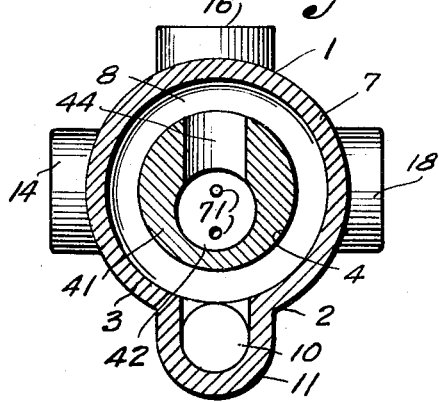
Fig. 4 is a similar section on the line 4—4 of Fig. 2.

Referring more in detail to the drawings:

1 designates a control mechanism constructed in accordance with the present invention and which includes a casing 2 including a cylindrical member 3 having a cylindrical chamber 4 extending from one end to the other and which is closed at the ends by heads 5 and 6 as later described. The member 3 has an annular enlargement 7 about midway thereof to accommodate an inwardly opening annular groove or passageway 8 encircling the cylindrical chamber 4 and which connects through a lateral port 9 with an inlet channel 10 that is formed in an extension 11 of the side of the member 3 and which has an internally threaded end 12 to connect with a source of fluid supply (not shown). Located in circumferential series about the member 3 are pairs of radially extending bosses 13—14, 15—16, and 17—18 having through bores 19 internally threaded as at 20 at their outer ends to receive pipes (not shown) by which the bores are adapted to be connected with the respective mechanisms to be actuated by the fluid; for example, the hydraulic feed cylinder, the table shifting jack, and the mast elevating jack of a rotary drilling rig (not shown). The inner ends of the bores intersect the piston chamber in spaced pairs of ports 21 and 22 which are adapted to be closed by the valving element to be registered with ports of the valving element later described, one of the ports 21 of each pair being located on one side of the passageway 8 while the other port 22 is located on the opposite side of the passageway.

The head 5 has a bore 23 registering with the valve chamber and is internally threaded as at 24 for providing a connection with a pipe for returning the fluid to the source of supply. The head 5 is provided with a flange 25 having openings 26 through which fastening devices 27 such as cap screws are projected into registering sockets 28 formed in the end of the casing member 3. The head 6 has a similar flange 29 provided with openings 30 through which cap screws 31 are projected into threaded sockets 32 at that end of the cylindrical section. The head 6 also includes an axle-like body 33 which has an annular stop shoulder 34 which cooperates with a ring 35 that is threaded onto a reduced extension 36 to retain a collar 37 of a lever-carrying bracket 38, which is mounted thereon and is adapted to be rotated circumferentially but which is rigidly retained from longitudinal movement by stop engagement with the shoulder 34 on one side and the ring 35 on the other as best shown in Fig. 2. The axle-like body 33 has a through axial bore 39 to slidably and rotatably accommodate therein a shift rod or shaft 40 that is fixed to a valving or control element 41. The control element conforms to the cylindrical chamber 4 and is freely slidable and rotatable therein. The member 41 has an eccentrically located longitudinal bore 42 opening from the end thereof nearest the head 5 and which terminates short of the opposite end as at 43. Formed in the side of the member 41 opposite the offset bore 42 is a lateral port 44 adapted to selectively connect the annular passageway 8 in any position of the member 41 when the member 41 is in neutral position or to register with any one of the ports previously mentioned. Also formed in that side of the valving member on the respective sides of the lateral port are longitudinal recesses 46 and 47, each having a length adapted to bridge the space including one of the ports and the width of the passageway 8 whereby flow may be established between any one of the ports and the annular passageway while another flow in reverse direction is being maintained through the corresponding port of a pair of ports.

Figure 5:
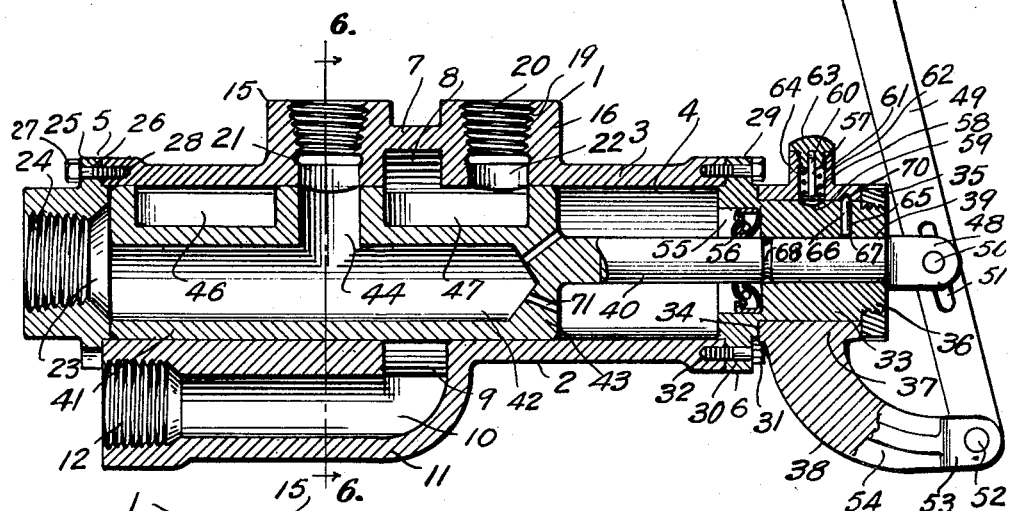
Fig. 5 is a sectional view similar to Fig. 2 illustrating the valving element shifted to a position for establishing flow of fluid through a pair of ports which are adapted to be connected to a mechanism to be actuated.
Figure 6:
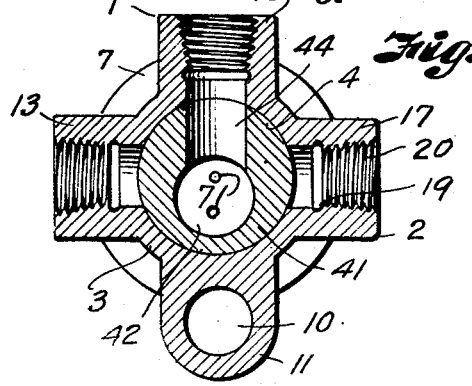
Fig. 6 is a cross section on the line 6—6 of Fig. 5.
Figure 7:
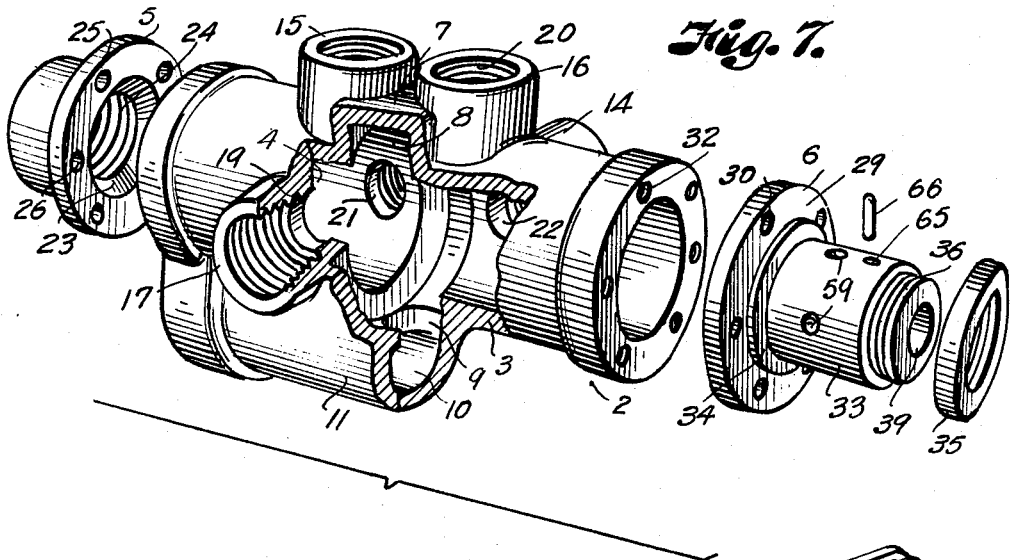
Fig. 7 is a perspective view of the parts of the casing for the control element shown in disassembled spaced relation, the main member thereof being broken away and shown in section to better illustrate the construction.
Figure 8:
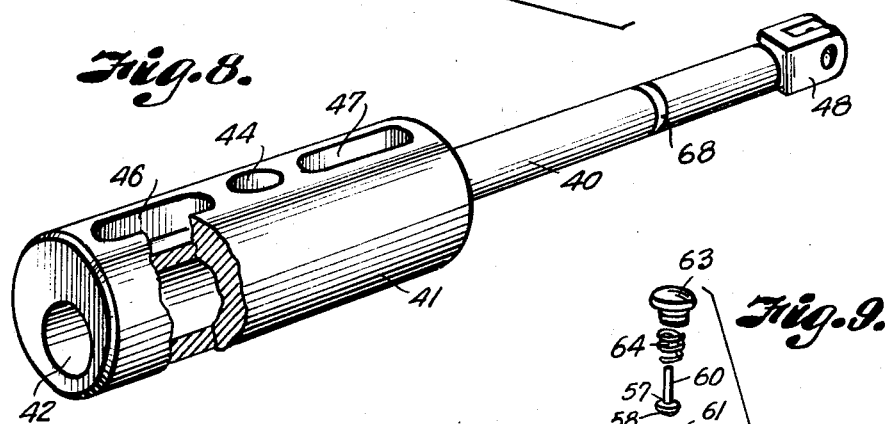
Fig. 8 is a perspective view of the valving or control element, a part being broken away to better illustrate the ports therein.
Figure 9:
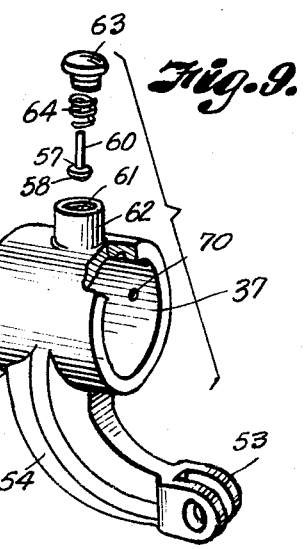
Fig. 9 is a perspective view of the operating lever, attaching bracket, and the parts of the latch therefor shown in disassembled spaced relation.
Figure 10:
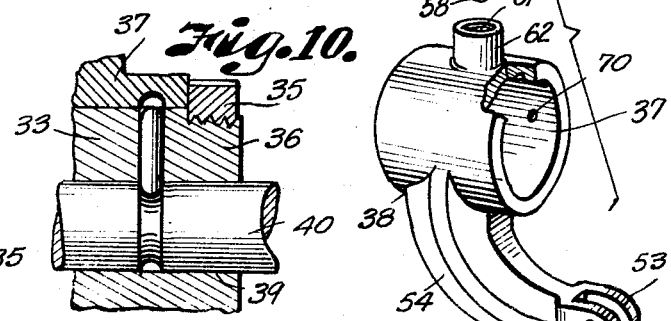
Fig. 10 is an enlarged vertical section through the interlock showing the actuating shaft of the control element in neutral position and ready to be turned to position the ports of the control element in relationship with another set of ports.
Figure 11:
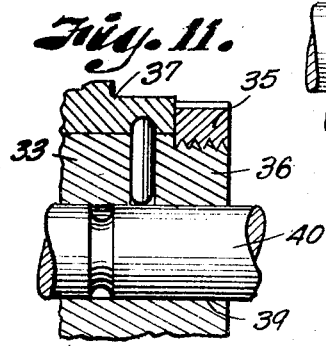
Fig. 11 is a similar view showing the interlock for preventing rotation of the control element and showing the shaft moved from neutral position.

The shift rod 40 projects through the outer end of the axle-like projection 34 and carries a yoke-shaped head 48 for connection with an operating lever 49, the connection being provided by a pin 50 extending through the ears of the yoke-shaped head and through a longitudinal slot 51 in the lever as shown in Figs. 1, 2, and 5. One end of the lever is pivotally connected by a pin 52 in a yoke-shaped end 53 with an arm 54 extending radially and longitudinally from the collar 37.

A seal is effected about the shifting rod by providing an annular recess 55 within the inner end of the head 6 and by inserting therein a suitable pressure packing ring 56.

With the structure thus far described, it is obvious that the valving member may be reciprocated from one end of the chamber 4 to the other by rocking the lever 49 on the pivot 52 and that the valve member may be rotated in either direction by applying a rotating force on the lever 49 which causes the collar 37 of the bracket to rotate on the projecting axle 33 of the head 6; however, in order to position the collar and consequently the ports of the valving element in position to register with the pairs of ports, the collar carries a friction latch 57 having a head 58 adapted to engage in one of the series of recesses 59 respectively located in axial alignment with the pairs of ports. The friction latch includes a stem 60 reciprocable within a bore 61 formed in a radial boss 62 of the collar and which bore is closed at the outer end by a cap 63. The head of the friction latch is at all times retained in position to engage one of the recesses by a coil spring 64 having one end engaging against the cap and the other end against the latch head as shown in Fig. 2.

With the arrangement thus far described, it is obvious that the valving member may be rotated in any longitudinal position thereof within its chamber. Consequently, it is possible to shift from one actuated means to the other without going through neutral position, that is where flow of pressure fluid is shut off to all of the actuated mechanisms and returned to the source of supply without building up a head pressure within the control mechanism. This safety feature is provided through an interlock between the actuating shaft or rod 40 and the axle-like projection 33 of the head 6 and the collar 37. The axle-like projection has a radial bore 65 slidably mounting a lock pin 66 having one end 67 adapted to engage in an annular groove 68 in the actuating rod when the radial port of the valving member is in alignment with the annular passageway 8 and which has an opposite end 69 adapted to engage in one of a series of recesses or stops 70 formed in the inner face of the collar when the shaft is reciprocated to move the control or valving member longitudinally within the recess so as to lock the lever-carrying bracket with respect to the axle-like projection as long as the groove 68 is out of registry with the pin 65 and thereby prevent rotation of the valving member by the lever until the lateral port of the valving member is again returned to registry with the passageway 8. Thus, the pin forms a positive lock to prevent shifting of the valve for effecting flow through any one of the pairs of ports while the valve is in any longitudinal position other than that when the lateral port registers with the passageway 8.

Pressures are equalized at the head end 43 of the valve member through ports 71 so as to facilitate movement of the valve or control member.

In using an apparatus constructed as described and assuming that the pairs of ports are respectively connected with the respective ends of the hydraulic jacks or other hydraulic mechanisms such as used in connection with rotary drilling rigs, the valving or control element 41 is positioned as shown in Fig. 2 so that the operating fluid is discharged under pressure into the passageway 8 through the lateral port 44 to the bore 42 in the valving member 41 and is returned to the source of supply through the bore 14 of the head 5. The fluid is thus maintained in circulation through the control mechanism without building up a head pressure therein. In this position of the valving member, the interlock pin 66 is engaged with the groove 68 in the shift rod so that the outer end 69 thereof clears the recesses 70 to permit rotation of the handle lever 49 and collar 37 of the bracket 38, which movement also turns the shift rod to position the longitudinal recesses 46 and 47 with any one of the pairs of ports 21 and 22; for example, assuming that the lever 49 is in perpendicular position with the passageways 46 and 47 connected with the ports 21 and 22 in the bosses 15 and 16, the pressure fluid may be delivered from the passageway 8 to either one of the ports 21 and 22 by rocking the lever 49 to shift the valve member in the proper direction, that is, the lateral port 44 is moved to register with the port 21, Fig. 5, and the recess 47 connects the passageway 8 with the port 22. The pressure fluid is then delivered from the passageway 8 through the recess 47 to the port 22 in the boss 16 and through the duct connected therewith to one end of the hydraulic mechanism connected thereto, while fluid is being returned from the other end of the hydraulic mechanism through the port 21 of boss 15 to lateral port 44, the fluid passing through the bore 42 for return to the source of supply through the threaded connection of the head 5.

If the hydraulic mechanism is to be reversed, the operating lever is swung in the opposite direction to register the port 44 with the port 22. During movement of the valving member the recess 46 passes across the port 21 and connects that port with the passageway 8 and the lateral port 44 moves into registry with the port 22, the recess 47 having been carried out of registry with the port 22. The pressure fluid is then delivered to the hydraulic jack through port 21 of the boss 15 and returned to the source of supply through the port 22 in the boss 20.

During this movement of the shift rod, the lock pin moves out of the groove 68 and the end 69 thereof moves into a recess 70 to lock the collar 37 with respect to the axle-like projection 33 so as to prevent any turning movement of the valving member thereby assuring accurate operation and registry of the respective recesses and ports.

When it is desired to shift to another set of ports, the valve member must be returned to neutral position since in any other position the lock pin 66 is engaging one of the recesses 70 so that it is impossible to turn the valving member. This is a safety feature which will prevent untimely operation of the hydraulic mechanisms as it assures that all of the hydraulic mechanisms are stopped and a neutral flow established before another hydraulic mechanism may be actuated.

The friction latch 58 automatically engages the recesses 59 when the recesses 46 and 47 are in registry with a pair of ports to retain the valving member in that position while it is being shifted longitudinally of the chamber 4.

From the foregoing it is obvious that I have provided a control valve whch is of simple construction and capable of controlling flow of fluid medium to a plurality of devices to be actuated selectively or in select directions.

It is also obvious that the control valve is operated by a single lever and that the interlock prevents shifting of the control element without first returning the control element to neutral position where the fluid flows freely to and from the source of supply.

What I claim and desire to secure by Letters Patent is:

1. An apparatus of the character described including a casing having a fluid inlet and a fluid outlet and a plurality of ports adapted to be connected with mechanisms to be operated by said fluid, a fluid control member reciprocably and rotatably mounted in the casing to connect the inlet and outlet ports and to connect any of said plurality of ports with said inlet and outlet, means for reciprocating and rotating the control member, and an interlock between the control member and the casing for preventing rotation of the fluid control member during reciprocation of said control member.

2. An apparatus of the character described including a casing having a cylindrical chamber provided with a fluid inlet and a fluid outlet port and having an annular passageway connected with one of said ports, a cylindrical valving member having an interconnecting lateral port and a longitudinal bore connected respectively with the port connected with the annular passageway and with the other of said casing ports, said casing having a plurality of pairs of ports arranged circumferentially of the casing with one port of each pair located on one side of the annular passageway and the other port of each pair on the opposite side, said valving member having means for respectively connecting a port on one side of the passageway with said passageway and the port on the opposite side of the passageway with said lateral port when the valving member is shifted coaxially of the casing, and means for reciprocating the valving member in the casing including means for rotating the valving member to selectively register with the pairs of ports.

3. An apparatus of the character described including a casing having a cylindrical chamber provided with a fluid inlet and fluid outlet port and having an annular passageway connected with one of said ports, a cylindrical valving member having an interconnecting lateral port and a longitudinal bore respectively connected with the port that is connected with the annular passageway and with said other port of the casing, said casing having a plurality of pairs of ports arranged circumferentially of the casing with one port of each pair located on one side of the annular passageway and the other port of each pair on the opposite side, said valving member having means for respectively connecting a port on one side of the passageway with said passageway and the port on the opposite side of the passageway with said lateral port when the valving member is shifted coaxially of the casing means for reciprocating the valving member in the casing including means for rotating the valving member to selectively register with the pairs of ports, and an interlock operable responsive to reciprocation of the valving member for preventing rotation of the valving member when the lateral port of the valving member is out of registry with said annular passageway.

4. An apparatus of the character described including a casing having a cylindrical chamber provided with an axially-positioned fluid outlet and a lateral fluid inlet port and having an annular passageway connected with said lateral port, a cylindrical valving member having a longitudinal bore and a lateral port opening from said bore, said bore having connection with the outlet port, said casing having a plurality of pairs of ports arranged circumferentially of the casing with one port of each pair located on one side of the annular passageway and the other port of each pair on the opposite side, said valving member having means for respectively connecting a port on one side of the passageway with said passageway and the corresponding port on the opposite side of the passageway with said lateral port of the valving member when the valving member is shifted coaxially in the casing, and means for reciprocating the valving member in the casing including means for rotating the valving member to selectively register with the pairs of ports.

5. An apparatus of the character described including a casing having an axial outlet port and an annular passageway connected with an inlet port in a side of said casing and having a plurality of pairs of ports arranged circumferentially of the casing with one port of each pair located on one side of the annular passageway and the other port of each pair on the opposite side, a cylindrical valving member in said casing having a longitudinal bore and a lateral port connected with said bore, said valving member having recesses for respectively connecting a port on one side of said passageway with said passageway and the other port of a pair of ports with the lateral port and when the valving member is shifted to register the lateral port with the first-named port of said pair of ports and the other of said pair of ports with the passageway of the casing, means for rotating the valving member to selectively register the lateral port in line with the pairs of ports including a shift rod connected with the valving member, a lever-carrying bracket rotatable relative to the casing, and a lever connected with said bracket and with said shift rod for reciprocating the valving member in the casing.

6. An apparatus of the character described including a casing having a cylindrical chamber provided with a lateral fluid inlet and an axial fluid outlet port and having an annular passageway connected with the inlet port, a cylindrical valving member having a longitudinal bore and radial port connected with said bore, said casing having a plurality of pairs of ports arranged circumferentially of the casing with one port of each pair located on one side of the circumferential passageway and the other port of each pair on the opposite side, said valving member having a recess adapted for connecting a port on one side of the passageway with said passageway when the port on the opposite side of the passageway is connected with said lateral port in the valving member in one position of the valving member, a shift rod connected with the valving member and slidably and rotatably mounted in a bearing opening of the casing, a lever-carrying bracket rotatable relative to the casing, a lever connected with said bracket and with said shift rod, and a pin slidable in the casing and adapted to engage an annular groove in the shift rod when the lateral port is in registry with the annular passageway in another position of the valving member and movable out of said groove and into a recess of the lever-carrying bracket when the lever is actuated to reciprocate the valving member.

7. An apparatus of the character described including a casing, a valving member slidable and rotatable in the casing, means for reciprocating and rotating the valving member in the casing including a shift rod connected with the valving member, a lever-carrying bracket rotatable relative to the casing, a lever carried by said bracket and connected with said shift rod, and a pin slidable in a part of the casing and adapted to engage an annular groove in the shift rod to permit rotation of the valving member and movable out of said groove and into a recess of the lever-carrying bracket when the lever is actuated to reciprocate the valving member to prevent rotation of the valving member during reciprocatory movement of said valving member.

8. An apparatus of the character described including a casing, a valving member slidable and rotatable in the casing, means for reciprocating and rotating the valving member in the casing including a shift rod connected with the valving member, a lever-carrying bracket rotatable relative to the casing, a lever carried by said bracket and connected with said shift rod, a pin slidable in a part of the casing and adapted to engage an annular groove in the shift rod to permit rotation of the valving member and movable out of said groove and into a recess of the lever-carrying bracket when the lever is actuated to reciprocate the valving member to prevent rotation of the valving member during reciprocatory movement of said valving member, and a friction latch between said bracket and said part of the casing to facilitate positioning of the valving member in said casing.

9. An apparatus of the character described including a casing having a fluid inlet and a fluid outlet and a plurality of ports adapted to be connected with mechanisms to be operated, a fluid control member movable in the casing and adapted to connect the inlet and outlet ports in one position of said member and any of said plurality of ports with the inlet and outlet in other positions of said control member, means for moving the control member to said positions, latch means having engaging positions corresponding with said plurality of ports, and an interlock between the control member and the casing.

10. An apparatus of the character described including a casing having a fluid inlet and a fluid outlet and a plurality of ports adapted to be connected with mechanisms to be operated by said fluid, a fluid control member reciprocably and rotatably mounted in the casing to connect the inlet and outlet ports and to connect any of said plurality of ports with said inlet and outlet, actuating means for reciprocating and rotating the control member, an interlock between the control member and the casing for preventing rotation of the fluid control member during reciprocation of said control member, and latch means having engaging positions corresponding with positions of said plurality of ports for retaining the actuating means from rotation when the control member is reciprocated.

11. An apparatus of the character described including a casing having a cylindrical chamber provided with a lateral fluid inlet and an axial fluid outlet port and having an annular passageway connected with the inlet port, a cylindrical valving member having a longitudinal bore and radial port connected with said bore, said casing having a plurality of pairs of ports arranged circumferentially of the casing with one port of each pair located on one side of the circumferential passageway and the other port of each pair on the opposite side, said valving member having a recess adapted for connecting a port on one side of the passageway with said passageway when the port on the opposite side of the passageway is connected with said lateral port in the valving member in one position of the valving member, a shift rod connected with the valving member and slidably and rotatably mounted in a bearing opening of the casing, a lever-carrying bracket rotatable relative to the casing, a lever connected with said bracket and with said shift rod, a pin slidable in a part of the casing and adapted to engage an annular groove in the shift rod when the lateral port is in registry with the annular passageway and movable out of said groove and into a recess of the lever-carrying bracket when the lever is actuated to reciprocate the valving member, and latch means carried by said bracket for restricting rotation of said bracket when the lateral port is in aligning registry with any of the pairs of ports.

12. An apparatus of the character described including a casing having a fluid inlet and a fluid outlet and a plurality of pairs of radially positioned ports adapted to be connected with mechanisms to be operated by said fluid, a fluid control member reciprocably and rotatably mounted in the casing to connect the inlet and outlet and to connect any of said pairs of ports with said inlet and outlet, actuating means for reciprocating and rotating the control member, means having stops corresponding with the respective positions of said pairs of radial ports, and means movable upon reciprocation of the fluid control member for engaging said stops to register the fluid control member with the pairs of radial ports.

13. An apparatus of the character described including a casing having a fluid inlet and a fluid outlet and a plurality of pairs of ports adapted to be connected with mechanism to be operated, a fluid control member rotatably and slideably movable in the casing for connecting the inlet and outlet in one position of said member and to provide flow to and from the respective pairs of ports in other positions of said control member, a stem connected with the fluid control member for moving the control member rotatably and slideably to said positions, safety means for controlling movement of the fluid control member including a bracket having recesses related with the positions of the pairs of ports, and means engaged with the stem and adapted to be registered with one of said recesses upon turning of the stem and projectable into said recess upon sliding movement of the stem.

14. An apparatus of the character described including a casing having an axial bore and a plurality of radially arranged pairs of ports with the ports of each pair of ports arranged along the axis of the bore on the respective sides of an annular passageway encircling the bore and connected with an inlet port in the casing, a cylindrical control member having axial sliding movement in the bore to register the port therein selectively with the respective ports of any pair of ports and the passageway and rotatable in said bore to register the port of said control member with a selected pair of radial ports, means connected with the control member for moving the control member to said positions, a bracket connected with said control member moving means and having stop portions related with the positions of the pairs of ports, and means movable with said control member moving means for engaging said stops to position the control member with respect to the pairs of ports.

ALBERT W. BRAITHWAITE.

REFERENCES CITED

The following references are of record in the file of this patent:

UNITED STATES PATENTS

| Number | Name | Date |
|---|---|---|
| 1,943,865 | Hennessey | Jan. 16, 1934 |
| 2,202,216 | Madsen | May 28, 1940 |
| 2,322,518 | Huber | June 22, 1943 |
| 2,332,419 | White | Oct. 19, 1943 |